(12) United States Patent
Tachikawa

(10) Patent No.: US 6,191,908 B1
(45) Date of Patent: Feb. 20, 2001

(54) THERMAL ASPERITY COMPENSATING METHOD, DATA REPRODUCTION ERROR COMPENSATING METHOD, AUTOMATIC GAIN CONTROL SYSTEM AND MAGNETIC DISK UNIT

(75) Inventor: Takashi Tachikawa, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/106,310

(22) Filed: Jun. 29, 1998

(30) Foreign Application Priority Data

Jun. 30, 1997 (JP) .................................................. 9-174144

(51) Int. Cl.[7] ....................................................... G11B 5/02
(52) U.S. Cl. ................................................. 360/67; 360/25
(58) Field of Search .................................. 360/67, 25, 61, 360/51, 53

(56) References Cited

U.S. PATENT DOCUMENTS 5,233,482 * 8/1993 Galbraith et al. ..................... 360/46
5,818,656 * 10/1998 Klaassen et al. ...................... 360/67
5,847,890 * 12/1998 Hattori ................................ 360/67
5,940,233 * 8/1999 Malone, Sr. .......................... 360/51

FOREIGN PATENT DOCUMENTS 6-28785    2/1994 (JP) .
10-188203  7/1998 (JP) .
11-3504    1/1999 (JP) .

* cited by examiner

Primary Examiner—W. Chris Kim
(74) Attorney, Agent, or Firm—McGuireWoods, LLP

(57) ABSTRACT

A magnetic disk unit lowers a possibility to cause data reproduction errors by setting a gain of a variable gain amplifier (VGA) at a predetermined fixed level for a predetermined time when an output from the VGA which amplifies an input signal is changed to a value smaller than an optimum value upon occurrence of a thermal asperity and then restoring a variable gain condition so that an output amplitude automatically has a certain preset value.

8 Claims, 7 Drawing Sheets

(A) VGA INPUT WAVEFORM
(200mV/div,1us/div)

(B) VGA OUTPUT WAVEFORM
(GAIN NOT HELD)
(2V/div,1us/div)

(C) VGA OUTPUT WAVEFORM
(GAIN HELD)
GAIN HELD AFTER
OCCURRENCE OF TA
(2V/div,1us/div)

(D) VGA OUTPUT WAVEFORM
(GAIN HELD)
GAIN HELD AFTER
OCCURRENCE OF TA
(2V/div,1u/div)

(*)SECTION IN WHICH VGA
GAIN IS NOT AT AN OPTIMUM

THERMAL ASPERITY COMPENSATING METHOD, DATA REPRODUCTION ERROR COMPENSATING METHOD, AUTOMATIC GAIN CONTROL SYSTEM AND MAGNETIC DISK UNIT

BACKGROUND OF THE INVENTION

1. Field of the Invention

The present invention relates to a magnetic disk unit which utilizes a magnetoresistance type head, and more specifically a method to compensate data reproduction errors due to thermal asperities, an automatic gain control system and an automatic gain control unit.

2. Description of the Prior Art

Though magnetic flux induction type magnetic heads were conventionally used in magnetic disk units, for example, magnetoresistance type heads (hereinafter referred to as MR heads) have been adopted as data is recorded at higher densities. For recording data at a high density in a magnetic recorder, on the other hand, it is necessary to shorten a distance between a head and a medium. When this distance is shortened, a protrusion or a matter such as dust adhering to the medium may cause contact between the head and the medium. Upon such a contact, the MR head is momentarily heated, thereby enhancing resistance of an MR film. This resistance change causes a phenomenon that a reproduction output from the head is abruptly changed as shown in FIG. 4. This phenomenon is known as a thermal asperity (hereinafter abbreviated as a TA). During occurrence of a TA, data cannot be discriminated and may be reproduced erroneously.

Since a gain loop used in an automatic gain controller and a timing loop used in a phase controller are generally extremely sensible of a transient DC phenomenon which is incidental to the thermal asperity, Japanese Patent Application Laid-Open No. 6-28785, for example, discloses a method, as means to minimize data reproduction errors during the occurrence of a TA, which uses a hold circuit to inactivate these feedback loops during a period of a TA.

A first problem is that the method disclosed by Japanese Patent Application Laid-Open No. 6-28785 may cause data reproduction errors since it forms a section where a gain of a variable gain amplifier (hereinafter abbreviated as VGA) is lower than an optimum level as shown in FIG. 5C when the VGA is held immediately after detecting occurrence of a TA.

The data reproduction errors are caused due to a fact that the gain is held with a delay time after the detection of the TA and an automatic gain controller (hereinafter abbreviated as an AGC) operates for this delay time, whereby a gain of the VGA has already been controlled to a low level before it is held. Further, it is general that an AGC has a slow response to a gain variation from a low level to a high level and requires a time which is longer than a time required vary a gain from a high level to a low level, whereby data reproduction errors are apt to be caused for this long response time.

A second problem is that the method does not control a gain hold of the VGA to an optimum level and allows data reproduction errors to be caused when a TA occurs immediately before reaching a data start location in a case where a gain of the VGA is held at a start time of an operation to read a certain set of data.

The data reproduction errors may be caused due to a fact that the TA occurs before the gain is held as shown in FIG. 5D and the gain has been lowered by the AGC to a low level at a start time of the gain hold operation, whereby the gain is held while it is at a level lower than an optimum level.

SUMMARY OF THE INVENTION

A primary object of the present invention is to provide a magnetic disk unit which is capable of lowering a possibility to allow data reproduction errors to be caused due to thermal asperities, etc., and a method to compensate such data reproduction errors.

The present invention provides an automatic gain control system having a variable gain amplifier (hereinafter abbreviated as VGA) which receives a read signal as an input and normally outputs a constant amplitude by feeding back its output comprising:

a gain determination circuit which keeps a gain of the variable gain amplifier at a fixed level for a predetermined duration with a predetermined delay time after detection of a thermal asperity (hereinafter abbreviated as TA) from the read signal, wherein the fixed level is the same as or higher than that of a gain immediately before occurrence of the TA.

The present invention provides an automatic gain control system having a variable gain amplifier (hereinafter abbreviated as VGA) which receives a read signal and normally outputs a constant amplitude by feeding back its output comprising:

a gain determination circuit which keeps a gain of the variable gain amplifier at a fixed level for a predetermined duration with a predetermined delay time after detection of a thermal asperity (hereinafter abbreviated as TA) from the read signal, wherein a plurality of gains are available as the fixed level and the gain determination circuit is capable of optionally selecting a plurality of gains as the fixed level, and wherein the fixed level is the same as or higher than a gain immediately before occurrence of the TA.

The present invention provides an automatic variable gain control system further comprising:

memory means which stores the gain levels selectable as the fixed level for the variable gain amplifier, the delay time and the duration; and TA amplitude range detecting means for detecting, out of amplitude ranges preset in a predetermined number, one which contains an amplitude of a DC component of an output signal mainly due to a thermal asperity in a magnetoresistance effect type heads located.

The present invention provides an automatic gain control system, wherein the gain determination circuit further comprises:

a plurality of variable gain decider which gives a variable gains for normally obtaining an output having a constant amplitude by feeding back an output from the VGA, a plurality of fixed gain deciders which give fixed gains different from one another, a switch section which selects a gain decider which gives an adequate gain out of the variable gain deciders and the plurality of fixed gain deciders, and connects it to the VGA as a gain control signal for the VGA, and gain selection/timing control means which controls the switch section so as to select one of the fixed gains and a timing of this selection while referring to the data stored in the memory means on the basis of a detection result of the TA amplitude range detecting means.

The present invention provides an automatic gain control system further comprising:

read start signal generating means which outputs a read start signal indicating a read start to the gain selection/timing control means.

The present invention provides a thermal asperity compensating method for magnetoresistance effect type heads comprising:

a step of setting a gain of a variable gain amplifier at a fixed level at which a predetermined constant read output amplitude is normally obtainable after occurrence of a thermal asperity or at a higher level, and a subsequent step of setting a gain of the variable gain amplifier at a variable level to control so that the predetermined constant read output amplitude is obtainable.

The present invention provides a thermal asperity compensating method for magnetoresistance effect type heads comprising:

a step of reading other reproducible data when a data reproduction error occurs, a step of setting a gain used for reading the reproducible data as a fixed level of variable gain amplifier, and a step of reading the data which was reproduced erroneously.

The present invention provides a thermal asperity compensating method for magnetoresistance effect type heads comprising:

a step of reading other reproducible data when a data reproduction error occurs, a step of setting a gain level used for reading the reproducible data at a fixed level or higher for a variable gain amplifier, and a subsequent step of setting a gain of the variable gain amplifier at a variable level to control so that the predetermined constant read output amplitude is obtainable.

When a gain of a VGA is not at an optimum level due to occurrence of a TA, or when a gain is lower than an optimum level in particular, it is possible to lower a possibility of data reproduction errors by fixing a gain at the optimum level or a higher level for a certain duration so as to quicken response of a VGA output. Though data reproduction errors may be caused due to a gain which is held at a low level when a TA occurs immediately before a start of definite data at which a gain of a VGA is to be held in particular, it is possible to prevent errors even in such a case.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

Now, a first embodiment of the present invention will be described in detail with reference to the accompanying drawings.

Figure 1:
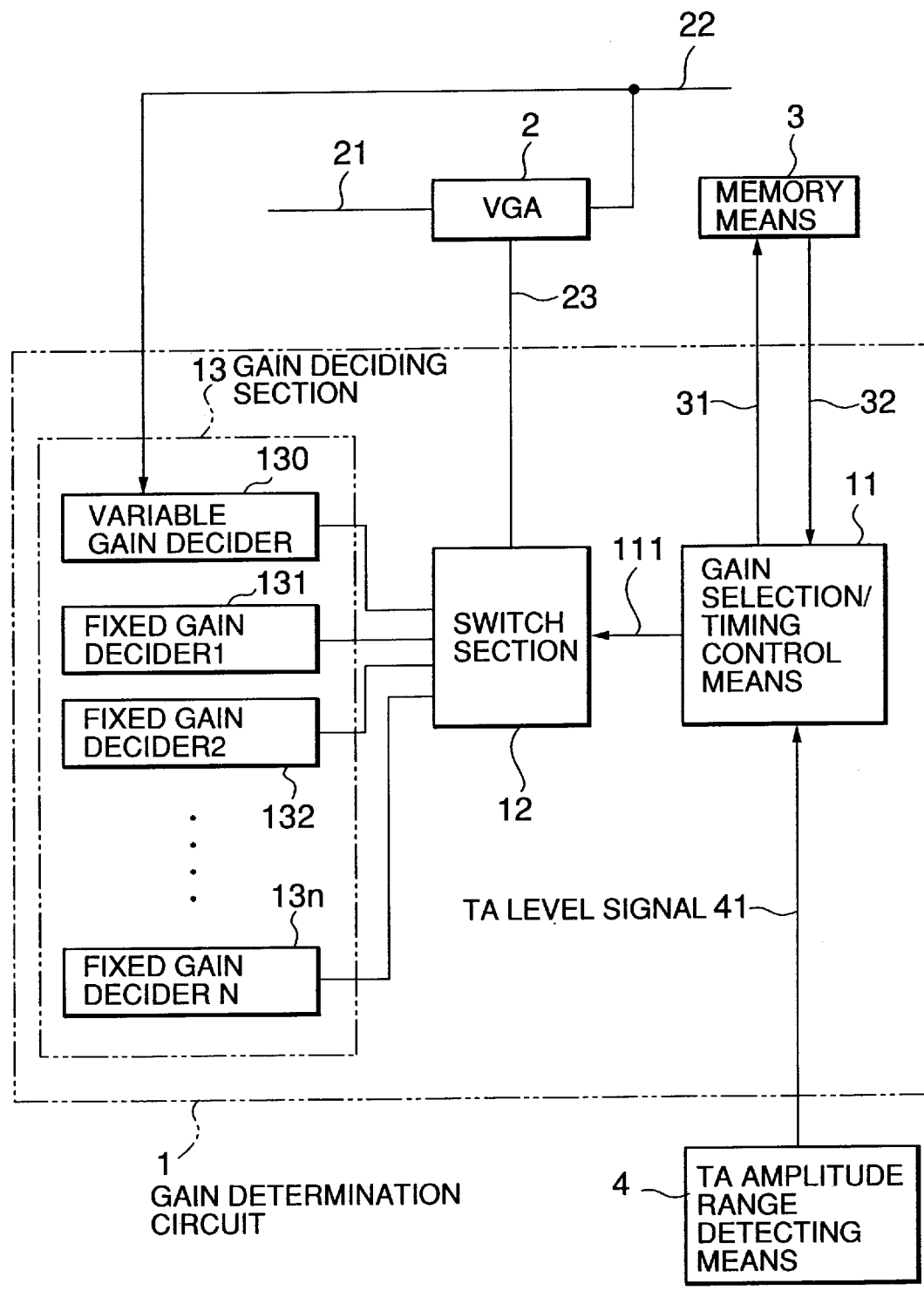
FIG. 1 is a block diagram illustrating a first embodiment of the variable gain control system according to the present invention.

Referring to FIG. 1, a gain determination circuit 1 which determines a gain level of a VGA 2 is connected to the VGA 2 to be used in a magnetic disk unit. The VGA 2 receives a signal which is read out of a magnetic medium by a magnetic head and amplified as a VGA input signal 21, outputs a VGA output signal 22 and performs processings such as data discrimination at a latter stage thereof.

Connected to the gain determination circuit I are memory means 3 which stores data to be utilized for selecting a gain and a timing, and TA amplitude range detecting means 4 which detects one of amplitude ranges preset in a predetermined number which contains an amplitude upon occurrence of a TA and generates a TA level signal 41 indicating a detection content. The gain determination circuit 1 comprises a switch section 12 which selects a gain, a gain deciding section 13 which is connected to the VGA 2 through the switch section 12 and gain selection/timing control means 11 which controls the switch section 12. The gain selection/timing control means 11 controls the switch section 12 so as to select one of gain deciders in the gain deciding section 13 and determines a duration of this selection. The gain deciding section 13 further comprises a variable gain decider 130 which is means for automatically varying a gain so that a read waveform output has a certain optionally set constant amplitude and an arbitrary number of fixed gain deciders 131 through 13n which set gains at certain fixed levels.

The VGA 2 receives a signal which is read out of the magnetic medium by the magnetic head and amplified as the VGA input signal 21, outputs it as the VGA output signal 22, and performs processing such as data discrimination at its latter stage.

In the gain decider circuit 1 which determines a gain of the VGA 2 in the magnetic disk unit shown in FIG. 1, it is desirable to use a memory permitting data rewriting as the memory means 3 which stores the data to be utilized for selecting timings of a gain, a delay time, a duration, etc.

Speaking concretely, it is conceivable to use a random access memory (RAM) or a non-volatile flash memory as the memory means 3. A read-only memory (ROM) which permits data rewriting only in a certain definite condition may be used as the memory means 3 when data is to be rewritten at a low frequency. Though a switch which can be electrical may be used as the switch section 12, it is desirable that the switch does not change a gain decided by the gain deciding section 13. Since a gain of a VGA is decided mostly by a voltage at a gain deciding terminal, the fixed gain deciders can be configured, for example, so as to be set at certain fixed voltages with resistance type potential dividers. It is preferable to use charge pumps as the variable gain deciders as in the general practice. A delay time from occurrence of a TA to fixing of a gain and a duration for a fixed gain are to be set at optimum levels on the basis of experiments or the like. The duration is sufficient so far as it is long enough to allow a current gain to be enhanced to a desired higher level.

Then, operations of the circuit shown in FIG. 1 will be described in detail with reference to the accompanying drawings.

A gain of the VGA 2 is normally determined by connecting it through the switch section 12 to the variable gain decider 130 comprised in the gain deciding section 13. The variable gain decider 130 automatically varies a gain continuously until a read waveform output has a certain constant amplitude by feeding back the VGA output signal 22 from the VGA 2 to the variable gain decider 130. When a peak value of an amplitude of a TA exceeds a certain definite value at occurrence of a TA, a TA level signal 41 is sent from the TA amplitude range detecting means 4 to the gain selection/timing control means 11. This signal indicates one of amplitude ranges preset in a predetermined number which contains the TA level signal. Upon receiving this signal, the gain selection/timing control means 11 controls the switch section 12 so that it selects optimum one of the fixed gain deciders 131 through 13n with a delay time (71 in FIG. 6C) and a duration (72 in FIG. 6C) which are set in the memory means 3. The optimum one is a fixed gain decider which sets a gain that is the same as or slightly higher than that before the occurrence of the TA. In other words, the optimum one is a fixed gain decider that sets a lowest gain out of the fixed gain deciders which set gains not lower than that before occurrence of the TA. After lapse of the duration, the switch section 12 selects the variable gain decider 130, thereby restoring a normal operating condition.

Now, description will be made of an effect of the first embodiment of the present invention.

In the first embodiment of the present invention, a gain of the VGA 2 is set upon occurrence of a TA at a fixed level which is the same as or higher than that immediately before the occurrence of the TA. Generally speaking, a time to respond to a variation from a low gain to a high gain is several times as long as a time to respond to a variation from the high gain to the low gain. Since a DC component of a reproduction signal abruptly increases upon occurrence of a TA, an AGC due to the feedback loop of the VGA output signal 22 is activated when the variable gain decider 130 is used, thereby setting a gain at a low level. Accordingly, the VGA 2 responds to a variation from the low gain to a high gain at a stage to restore the normal condition of a reproduction signal, whereby a long time is required to restore an optimum gain and data reproduction errors are apt to be caused. By setting a gain at rather a high level so as to vary a low gain to a high level or shorten a response time, it is possible to reach a location where the gain resumes a normal level and shorten a time for which data reproduction errors are caused at a high possibility.

Figure 6A:
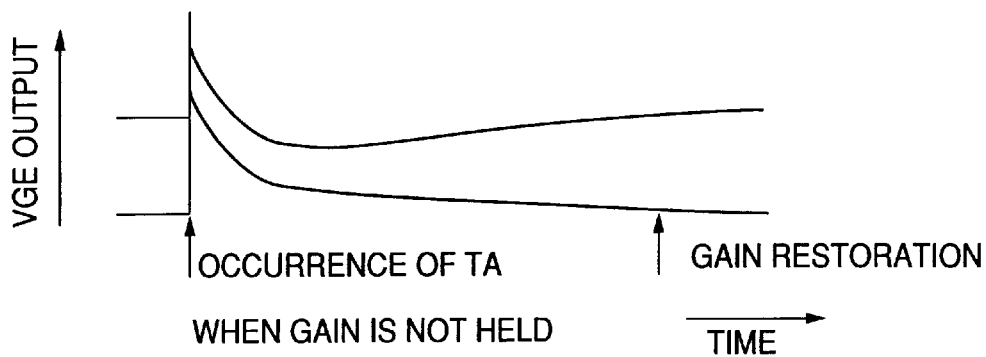
FIG. 6A is a diagram illustrating waveform of an output from a VGA in which a gain is not held.
Figure 6B:
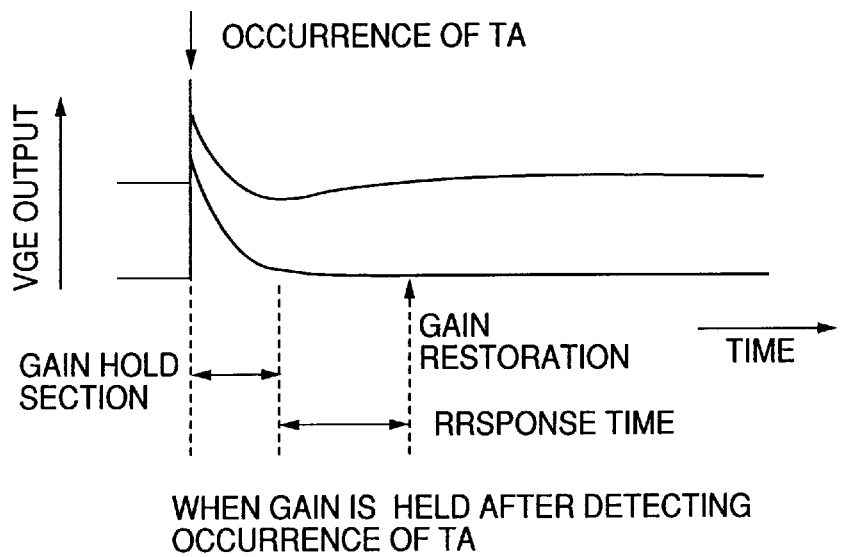
FIG. 6B is a diagram illustrating an output from the VGA in which a gain is held after occurrence of a TA.

Though there is available a conventional technique which holds a gain immediately after occurrence of a TA as shown in FIG. 6B, the gain has already been lower than a normal level before the gain is held after detection of the occurrence of the TA, whereby a circuit responds to a variation of a gain from a low level to a high level until it resumes a normal level after releasing the gain hold as shown in FIG. 6B.

Figure 6C:
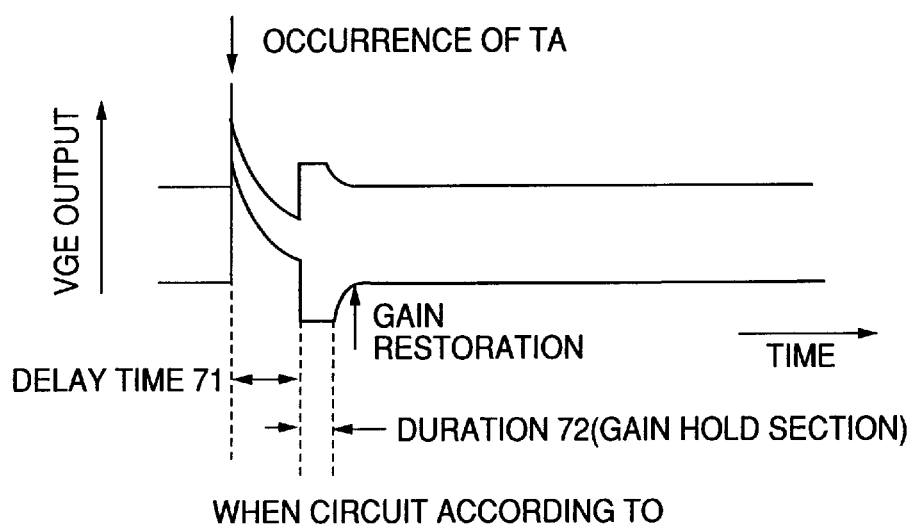
FIG. 6C is a diagram illustrating a waveform of an output from the VGA according to the present invention.

In contrast, the circuit according to the present invention is configured to set a gain at rather a high fixed level and quickly respond to a variation of a gain from a high level to a low level, thereby shortening a time to restore a gain to a normal level as shown in FIG. 6C.

Now, a second embodiment of the present invention will be described in detailed with reference to the accompanying drawings.

Figure 2:
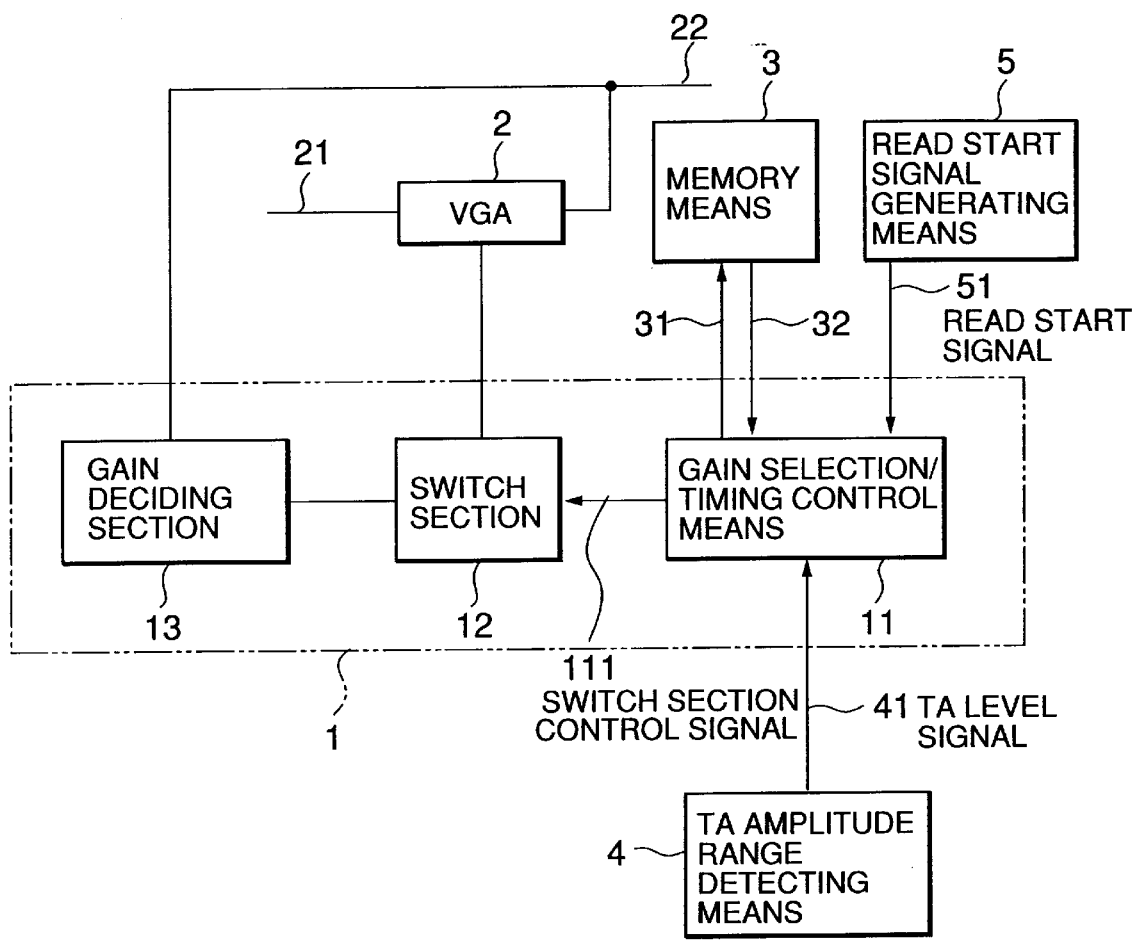
FIG. 2 is a block diagram illustrating a second embodiment of the variable gain control system according to the present invention.

Referring to FIG. 2, the second embodiment further comprises read start signal generating means 5 for gain selection/timing control means 11 in addition to the all components of the first embodiment. A TA level signal 41 which is generated by a TA amplitude range detecting means 4 is input into the gain selection/timing control means 11 as in the first embodiment.

Figure 5A:
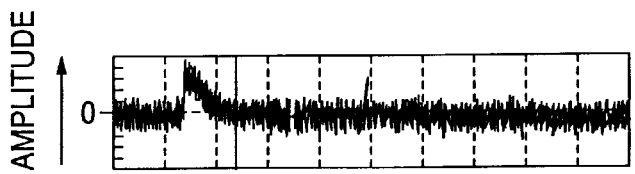
FIG. 5A is a diagram exemplifying a waveform of a signal to be input into a VGA which is affected by a thermal asperity.
Figure 5B:
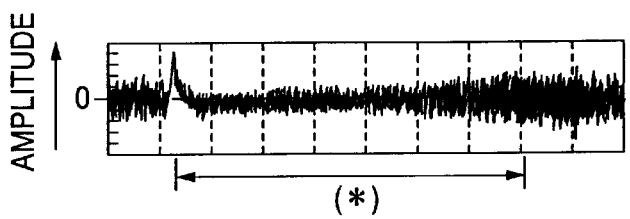
FIG. 5B is a diagram exemplifying a waveform of an output from a VGA in which signal affected by a thermal asperity is input and a gain is not held.
Figure 5C:
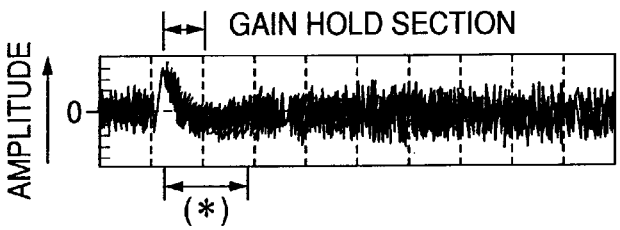
FIG. 5C is a diagram exemplifying a waveform of an output from the VGA in which a signal affected by a thermal asperity is input and a gain is held immediately after occurrence of a thermal asperity.
Figure 5D:
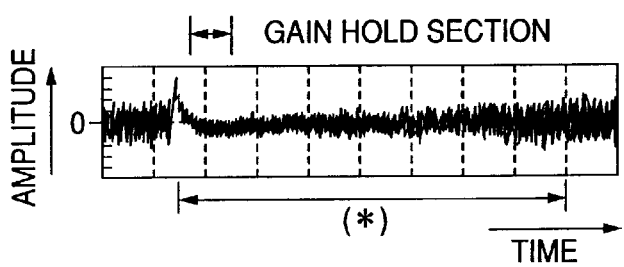
FIG. 5D is a diagram exemplifying a waveform of an output from a VGA in which a signal affected by a thermal asperity is input and gain is held after occurrence of a thermal asperity.

Though there is available a general method which reduces data reproduction errors by rereading the same data while holding a gain of a VGA from a start of a read operation when data is reproduced erroneously due to occurrence of a TA, the gain may be held at a level lower than an optimum level as indicated by a waveform of a VGA output shown in FIG. 5D when the TA occurs immediately before a data start. In such a case, data is read with a gain fixed at a level which is the same as or higher than a gain before the occurrence of the TA or a gain which is used for reading other rereadable data. Alternately, it is possible to adjust an amplitude of a waveform of a VGA output to an optimum value and further reduce data reproduction errors by setting once at a fixed level and then selecting a variable gain level. Considering variations in characteristics and the like, it is desirable that the other readable data is that stored in the same head and the same cylinder which generate data reproduction errors. It is preferable in particular to use data stored in the same head as the rereadable data.

Figure 7A:
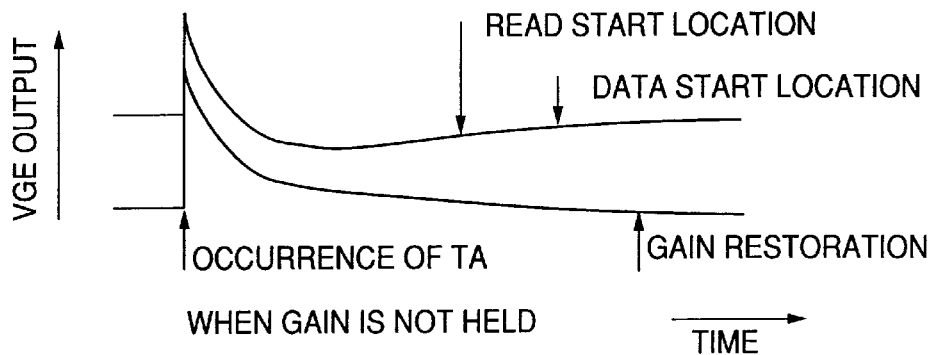
FIG. 7A is a diagram illustrating a waveform of an output from a VGA in which a gain is not held.
Figure 7B:
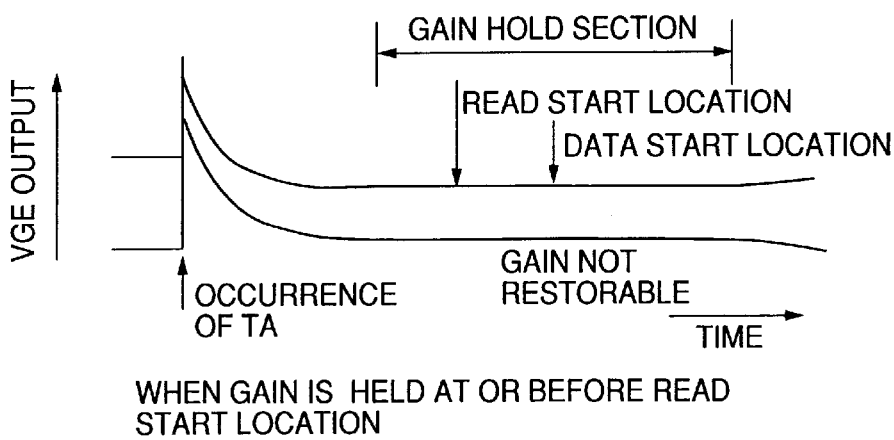
FIG. 7B is a diagram illustrating a waveform from a VGA in which gain is held at or after a read start location (prior art)
Figure 7C:
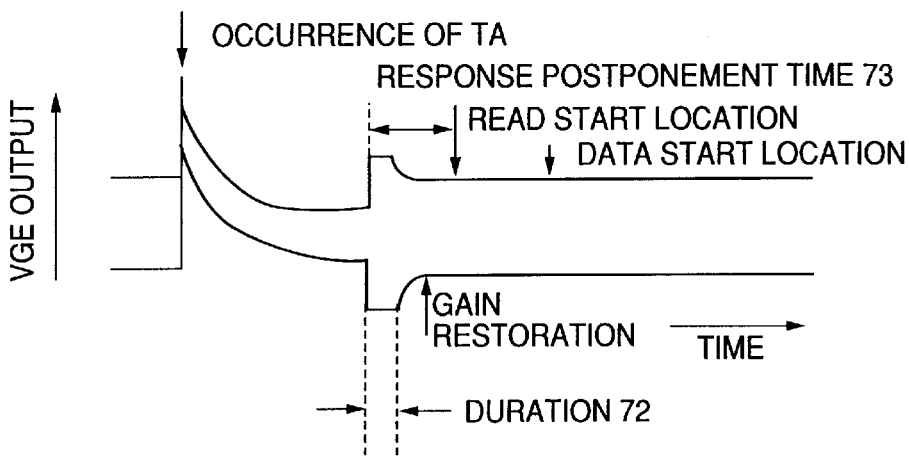
FIG. 7C is a diagram illustrating a waveform of an output from the VGA according to the present invention.

Now, operations of the circuit shown in FIG. 2 will be described in detail with reference to the accompanying drawings. Upon occurrence of a TA, the circuit interrupts a read operation with a magnetic head located over a certain sector. When the magnetic head is located over the same sector after one rotation, the circuit controls the gain selection/timing control means using a read start signal 51 and a TA level signal 41 as shown in FIG. 2, thereby accelerating restoration of a normal gain level as shown in FIG. 7C and is capable of preventing errors from being caused when a gain is held after occurrence of a TA as shown in FIG. 5D.

Figure 3:
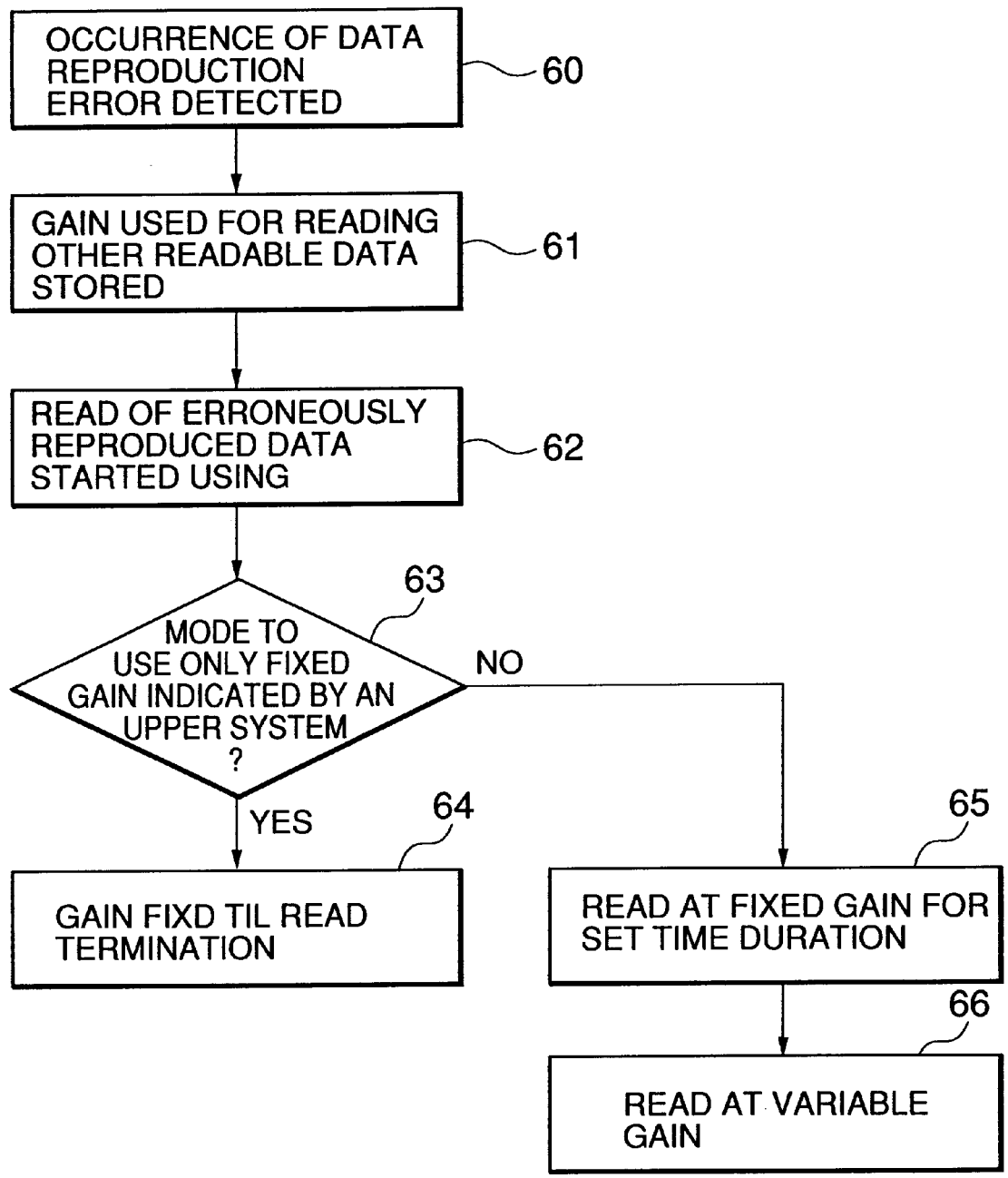
FIG. 3 is a flowchart illustrating the method for compensating a data reproduction error in a magnetic disk unit according to the present invention.
Figure 4:
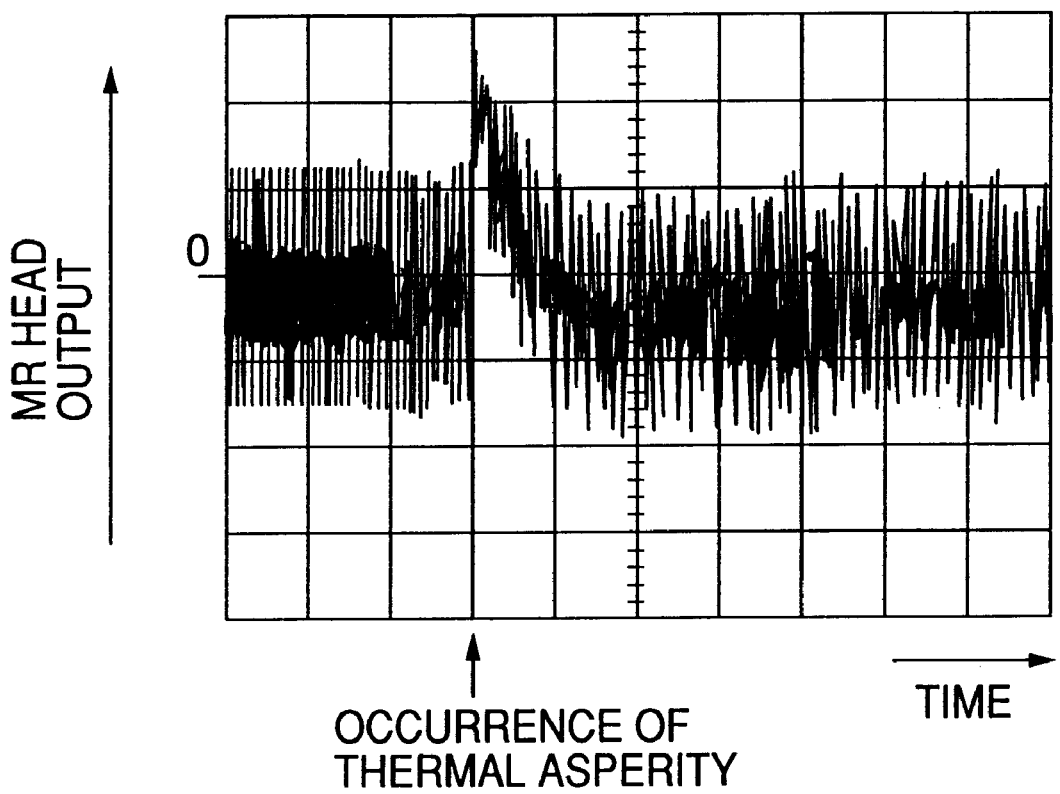
FIG. 4 is a diagram exemplifying a waveform of a reproduction output from an MR head which is affected by a thermal asperity.

When a data reproduction error is detected as in a flow-chart shown in FIG. 3 (a step 60), it is desirable to read other reproducible data with the same head, store a desirable fixed gain corresponding to a gain selected to read the reproducible data (a step 61) and read data using the stored fixed gain if an upper system (not shown) indicates a mode for which only a fixed gain is used (steps 62, 63 and 64). If the upper system does not indicates the mode for which only the fixed gain is used, it is possible to further reduce data reproduction errors by selecting a fixed gain level at a start time of a read operation and switching to a mode in which data is read at a variable gain level after lapse of a set time duration (steps 62, 63, 65 and 66).

A timing for fixing a gain level can be determined taking as standard a timing of the read start signal 51 for data which immediately precedes.

In addition to the effects obtainable with the first embodiment, the second embodiment of the present invention provides an effect to reduce data reproduction errors when a gain is held at a timing determined taking as standard the read start signal 51 for the data which immediately precedes.

No problem is posed when a gain is fixed before a data start location and a TA occurs after fixing the gain. When a TA occurs before fixing of a gain or a gain-hold section and a gain is fixed in a condition where it does not resume its normal level, however, the gain may be fixed while it is low, thereby constituting a cause for errors (FIG. 7B).

Such an inconvenience is not allowed by the circuit according to the present invention which determines a gain immediately before the gain hold and a fixed gain independently of each other as shown in FIG. 7C.

It is preferable to set a hold start location before a read start signal in conjunction with the read start signal and taking into consideration a time required to restore a normal gain level after releasing a gain hold (a response postponement time 73). When a time from the read start signal to the data start location has a sufficient margin, however, a gain hold may be started simultaneously with the read start signal or after this signal. When an error recurs in any of the cases mentioned above, however, a TA may occur in the vicinity of the location of gain hold location and a possibility to avoid errors can be enhanced by further displacing the fixing location forward or backward. Further, it is possible to obtain a more suitable gain hold timing by controlling a gain hold timing using the TA level signal 41 from the TA amplitude range detecting means 4.

The present invention provides a first effect that it is capable of reducing data reproduction errors due to occurrence of TAs.

This is because the circuit according to the present invention fixes a VGA at a gain level at which response time is shortened depending on the degrees of TAs or resumes a normal variable gain level after fixing, thereby shortening a time for which a VGA output does not have an optimum amplitude.

The present invention provides a second effect that it reduces data reproduction errors when a gain is held in synchronization with a read start signal.

This is because the circuit according to the present invention is capable of reducing data reproduction errors by reading, upon detection of a data reproduction error, other reproducible data and using a gain selected for reading this data as a fixed value when a data reproduction error is detected or holding a gain at a fixed level at a read start time and then switching to a mode wherein a gain is variable.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modification or embodiments as fall within the true scope of the invention.

What is claimed is:

1. An automatic gain control system having
   a variable gain amplifier (hereinafter referred to as a VGA) which receives a read signal as an input and normally outputs a constant amplitude by feeding back an output thereof comprising:
   a gain determination circuit which holds a gain of said variable gain amplifier at a fixed level for a predetermined time duration with a predetermined delay time after detecting a thermal asperity (hereinafter referred to as a TA) from said read signal;
   means for selecting said fixed level from a plurality of fixed levels to be higher than a gain which is immediately before occurrence of the TA.

2. An automatic gain control system having
   a variable gain amplifier (hereinafter referred to as a VGA) which receives a read signal as an input and normally outputs a constant amplitude by feeding back an output thereof comprising:
   a gain determination circuit which holds a gain of said variable gain amplifier at a fixed level for a predetermined time duration with a predetermined delay time after detecting a thermal asperity (hereinafter referred to as a TA) from said read signal; and
   means for providing plurality of values to said gain determination circuit, said gain determination circuit further including means for selecting from said plurality of values as said fixed level wherein said fixed level is higher than a gain of said variable gain amplifier immediately before occurrence of the TA.

3. An automatic gain control system according to claim 1 further comprising:
   memory means which stores said gain selected as the fixed level of said variable gain amplifier, said delay time and said time duration; and
   TA amplitude range detecting means which detects one of amplitude ranges preset in a predetermined number within which an amplitude of a DC component of an output signal provided mainly due to a thermal asperity in a magnetoresistance type head.

4. An automatic gain control system according to claim 3, wherein said gain determination circuit further comprises:
   a variable gain decider which normally gives a variable gain for obtaining a constant amplitude by feeding back the output from said VGA;
   a plurality of fixed gain deciders which give predetermined fixed gains different from one another;
   a switch section which selects one of said variable gain decider and said plurality of fixed gain deciders giving an adequate gain and connects it to said VGA as a gain control signal for said VGA; and
   gain selection/timing control means which controls said switch section so as to determine one of said fixed gains to be selected and a selection timing with reference to the data of said memory means based on the detection result by said TA amplitude range detecting means.

5. An automatic gain control system according to claim 4 further comprising:
   read start signal generating means which outputs a read start signal indicating a read start to said gain selection/timing control means.

6. A magnetic disk unit comprising an automatic gain amplification system including a variable gain amplifier (hereinafter referred to as a VGA) which receives a read signal as an input and normally outputs a constant amplitude by feeding back an output thereof, said variable gain amplifier including:

a gain determination circuit which holds a gain of said variable gain amplifier at a fixed level for a predetermined time duration with a predetermined delay time after detecting a thermal asperity (hereinafter referred to as a TA) from said read signal; and means for selecting said fixed level from a plurality of fixed levels to be higher than a gain immediately before occurrence of the TA.

7. A magnetic disk unit comprising an automatic gain amplification system including a variable gain amplifier (hereinafter referred to as a VGA) which receives a read signal as an input and normally outputs a constant amplitude by feeding back an output thereof comprising:

a gain determination circuit which holds a gain of said variable gain amplifier at a fixed level for a predetermined time duration with a predetermined delay time after detecting a thermal asperity (hereinafter referred to as a TA) from said read signal; and means for providing a plurality of values to said gain determination circuit, said gain determination circuit further comprising means for selecting from said plurality of values as said fixed level wherein said fixed level is higher than a gain of said variable gain amplifier immediately before occurrence of the TA.

8. An automatic gain control system according to claim 2 further comprising:

memory means which stores said gain selected as the fixed level of said variable gain amplifier, said delay time and said time duration; and TA amplitude range detecting means which detects one of amplitude ranges preset in a predetermined number within which an amplitude of a DC component of an output signal provided mainly due to a thermal asperity in a magnetoresistance type head.

* * * * *